United States Patent
Petridis

(10) Patent No.: US 8,644,040 B2
(45) Date of Patent: Feb. 4, 2014

(54) POWER SUPPLY HAVING A CHARGE PUMP CIRCUIT

(75) Inventor: Georgios Petridis, Walblingen (DE)

(73) Assignee: Flextronics International Kft., Tab (HU)

( * ) Notice: Subject to any disclaimer, the term of this patent is extended or adjusted under 35 U.S.C. 154(b) by 399 days.

(21) Appl. No.: 13/061,392

(22) PCT Filed: Aug. 6, 2009

(86) PCT No.: PCT/EP2009/060239
§ 371 (c)(1),
(2), (4) Date: Jun. 24, 2011

(87) PCT Pub. No.: WO2010/023080
PCT Pub. Date: Mar. 4, 2010

(65) Prior Publication Data
US 2011/0248776 A1     Oct. 13, 2011

(30) Foreign Application Priority Data
Aug. 29, 2008 (DE) .......................... 10 2008 046 324

(51) Int. Cl.
*H02M 3/06* (2006.01)

(52) U.S. Cl.
USPC ................ 363/62; 363/60; 307/110; 327/536

(58) Field of Classification Search
USPC .................. 307/110; 327/536; 363/59, 60, 62
See application file for complete search history.

(56) References Cited

U.S. PATENT DOCUMENTS

| | | |
|---|---|---|
| 2,367,725 A | 1/1945 | Lindh et al. |
| 3,648,337 A | 3/1972 | Greskamp et al. |
| 3,693,050 A | 9/1972 | Ettinger et al. |
| 3,972,380 A | 8/1976 | Hudson |
| 4,050,770 A | 9/1977 | Rigo |
| 4,313,025 A | 1/1982 | Grube, Jr. |
| 5,091,823 A | 2/1992 | Kanbarg et al. |

(Continued)

FOREIGN PATENT DOCUMENTS

DE    102008040018 A1    12/2009

OTHER PUBLICATIONS

International Search Report for International Application No. PCT/US2009/060239 mailed Oct. 12, 2009.

(Continued)

*Primary Examiner* — Adolf Berhane
*Assistant Examiner* — Lakaisha Jackson
(74) *Attorney, Agent, or Firm* — Haverstock & Owens LLP

(57) ABSTRACT

Exemplary embodiments of a power supply can be provided. The exemplary power supply can include a voltage source which supplies a supply voltage; and a charge pump circuit supplied by the voltage source and configured to generate an output voltage at an output. The charge pump can include alternating first and second clock states. In the first clock state, a first charge pump capacitor can be disposed between the supply voltage and ground and can be charged to the supply voltage by the voltage source, and a second charge pump capacitor can be coupled in series between the voltage source and the output. In the second clock state, the first charge pump capacitor and the second charge pump capacitor can be connected in series such that the charged connection of the first charge pump capacitor the first clock state can be grounded and the second charge pump capacitor can be charged by the voltage source.

11 Claims, 5 Drawing Sheets

(56) References Cited

U.S. PATENT DOCUMENTS

| | | | |
|---|---|---|---|
| 5,178,403 A | 1/1993 | Kemner et al. | |
| 5,251,721 A | 10/1993 | Orthnheim | |
| 5,262,934 A | 11/1993 | Price | |
| 5,606,491 A | 2/1997 | Ellis | |
| 5,678,646 A | 10/1997 | Fliege | |
| 5,760,637 A * | 6/1998 | Wong et al. | 327/536 |
| 5,942,728 A | 8/1999 | Chen | |
| 5,995,362 A | 11/1999 | Morel et al. | |
| 6,185,099 B1 | 2/2001 | Le Gal | |
| 6,323,623 B1 | 11/2001 | Someya et al. | |
| 6,419,037 B1 | 7/2002 | Kramer et al. | |
| 6,504,422 B1 * | 1/2003 | Rader et al. | 327/536 |
| 6,563,235 B1 * | 5/2003 | McIntyre et al. | 307/109 |
| 6,935,451 B2 | 8/2005 | Bell et al. | |
| 6,986,965 B2 | 1/2006 | Jenson et al. | |
| 7,016,177 B1 | 3/2006 | Thrap | |
| 7,482,816 B2 | 1/2009 | Odajima et al. | |
| 7,561,429 B2 | 7/2009 | Yahata et al. | |
| 7,724,551 B2 * | 5/2010 | Yanagida et al. | 363/60 |
| 8,044,706 B2 * | 10/2011 | Saman et al. | 327/536 |
| 8,240,411 B2 | 8/2012 | Nakatsu et al. | |
| 8,258,792 B2 | 9/2012 | Vandensande | |
| 2001/0033473 A1 | 10/2001 | Itahashi et al. | |
| 2002/0034082 A1 | 3/2002 | Yokomizo et al. | |
| 2004/0264223 A1 * | 12/2004 | Pihlstrom et al. | 363/89 |
| 2005/0146375 A1 | 7/2005 | Ker et al. | |
| 2005/0168911 A1 | 8/2005 | Staib | |
| 2006/0104006 A1 | 5/2006 | Saito et al. | |
| 2006/0109047 A1 | 5/2006 | Mensi et al. | |
| 2007/0007259 A1 | 1/2007 | Mikhailov | |
| 2007/0274027 A1 | 11/2007 | Vetter et al. | |
| 2008/0049476 A1 | 2/2008 | Azuma | |
| 2008/0150620 A1 * | 6/2008 | Lesso | 327/536 |
| 2008/0310079 A1 | 12/2008 | Toia et al. | |
| 2009/0145674 A1 | 6/2009 | Lee et al. | |
| 2009/0167315 A1 | 7/2009 | Lindsey | |
| 2009/0225496 A1 | 9/2009 | Toia et al. | |
| 2010/0060243 A1 | 3/2010 | Niigaki et al. | |
| 2010/0305794 A1 | 12/2010 | Foster | |
| 2012/0084033 A1 | 4/2012 | Liu et al. | |

OTHER PUBLICATIONS

German Office Action (english translation), dated Mar. 5, 2013, file No. 10 2008 062 657.0, Applicant: Flextronics International Kft., 8 pages.

\* cited by examiner

US 8,644,040 B2

POWER SUPPLY HAVING A CHARGE PUMP CIRCUIT

CROSS-REFERENCE TO RELATED APPLICATIONS

This application is the U.S. National Stage Application of International Application No. PCT/EP2009/060239, filed on Aug. 6, 2009, which was published as WO 2010/023080 on Mar. 4, 2010, and claims priority to German Patent Application No. 10 2008 046 324.8, filed on Aug. 29, 2008. The disclosures of the above-referenced applications are incorporated by reference herein in their entireties.

FIELD OF THE DISCLOSURE

The present disclosure relates to a power supply, and more specifically to exemplary embodiments of a power supply including a voltage source and a charge pump circuit supplied therefrom for generating an output voltage at an output.

BACKGROUND INFORMATION

While power supplies with charge pump circuits exist, these power supplies function at limited efficiency.

SUMMARY OF EXEMPLARY EMBODIMENTS

Exemplary embodiments according to the present disclosure can provide an improved power supply having a charge pump circuit so that it can work more efficiently.

According to certain exemplary embodiments of the present disclosure, the power supply can include two channels operating in parallel, each having a charge pump circuit, with the channels alternately supplying the output.

Exemplary advantage of the exemplary power supply can be seen in the simple realizing of an economical power supply.

An exemplary power supply according to an exemplary embodiment of the present disclosure can operate particularly efficiently when the charge pump circuits include two clock states and the charge pump circuit of one channel is preferably in one of the clock states and the charge pump circuit of the other channel is in the other clock state.

During the operation of the exemplary charge pump circuits of the two channels, it can be preferably provided for the charge pump circuits to be synchronously clocked so they synchronously change clock states.

This can be advantageously facilitated by having one clock generator clock the charge pump circuits of the two channels. For example, the charge pump circuits can thereby be configured as was described above in conjunction with the initially-described various exemplary embodiments of the exemplary power supply.

According to another exemplary embodiment of the present disclosure, the charge pump circuit can be configured to charge a first charge pump capacitor from a voltage source and charging a second charge pump capacitor from a series connection of the first charge pump capacitor and the voltage source.

An exemplary advantage of this exemplary embodiment can be that the two charge pump capacitors can generate a higher output voltage than can be supplied by the voltage supply.

Preferably, the charge pump circuit can supply an output from the series connection of the second charge pump capacitor and the voltage source so that an output voltage which can amount to up to three times the supply voltage of the voltage source can thereby be obtained.

Such exemplary high output voltage can facilitate the charge pump capacitors to provide significantly greater output power in a simple way and at limited size.

Thus, an exemplary embodiment of the present disclosure can provide the charge pump circuit which can include two clock states and to supply the output power in one of said clock states.

Advantageously, the two clock states can thereby exhibit the same clock period.

The exemplary charge pump circuit can provide for the first charge pump capacitor to be charged in a first clock state and an output voltage generated by the series connection of the second charge pump capacitor and the voltage source, and that the second charge pump capacitor is charged in a second clock state by the series connection of the voltage source and the first charge pump capacitor.

Charging the second charge pump capacitor in the second clock state can be accomplished particularly efficiently, for example, by the charge pump circuit charging the second charge pump capacitor from the voltage source via the ground-side series connection with the inverted first charge pump capacitor.

Such an exemplary ground-side series connection of the inverted first charge pump capacitor can be advantageously facilitated by the charge pump circuit alternately connecting a push-pull stage of a first connection of the first charge pump capacitor with two switches to a supply line and ground.

The exemplary ground-side series connection can be further realized by the charge pump circuit with two switches alternately connecting a second connection of the first charge pump capacitor to ground or to the second charge pump capacitor in series.

BRIEF DESCRIPTION OF THE DRAWINGS

Further features and advantages of the present disclosure constitute the subject of the following description as well as the graphic representation of several exemplary embodiments. For example.

DETAILED DESCRIPTION OF EXEMPLARY EMBODIMENTS

Figure 1:
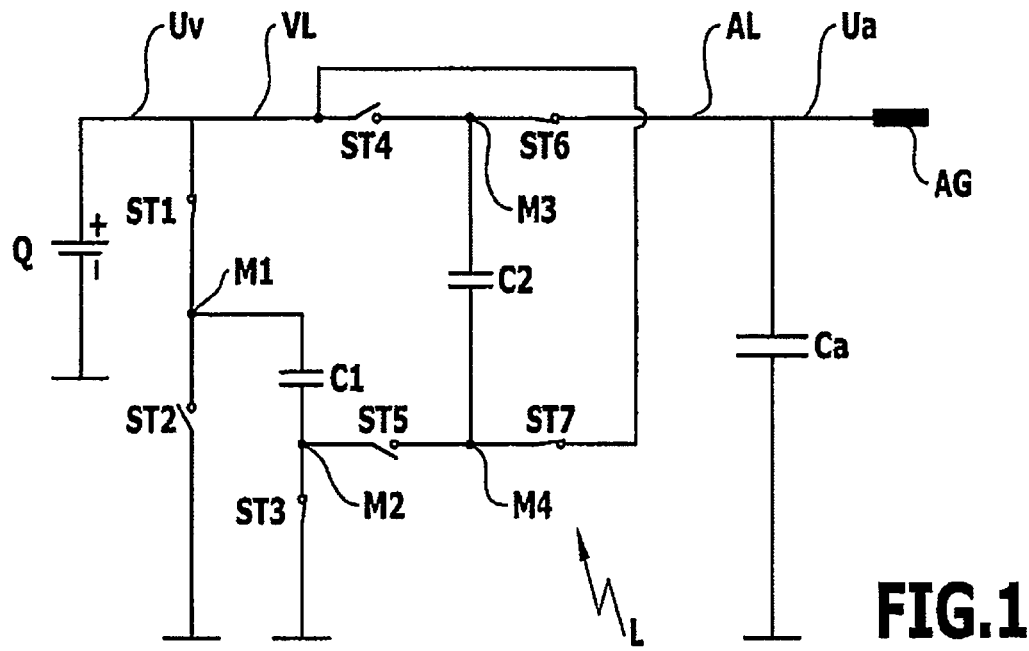
FIG. 1 is a circuit schematic diagram of an exemplary power supply in a first clock state according to an exemplary embodiment of the present disclosure.
Figure 2:
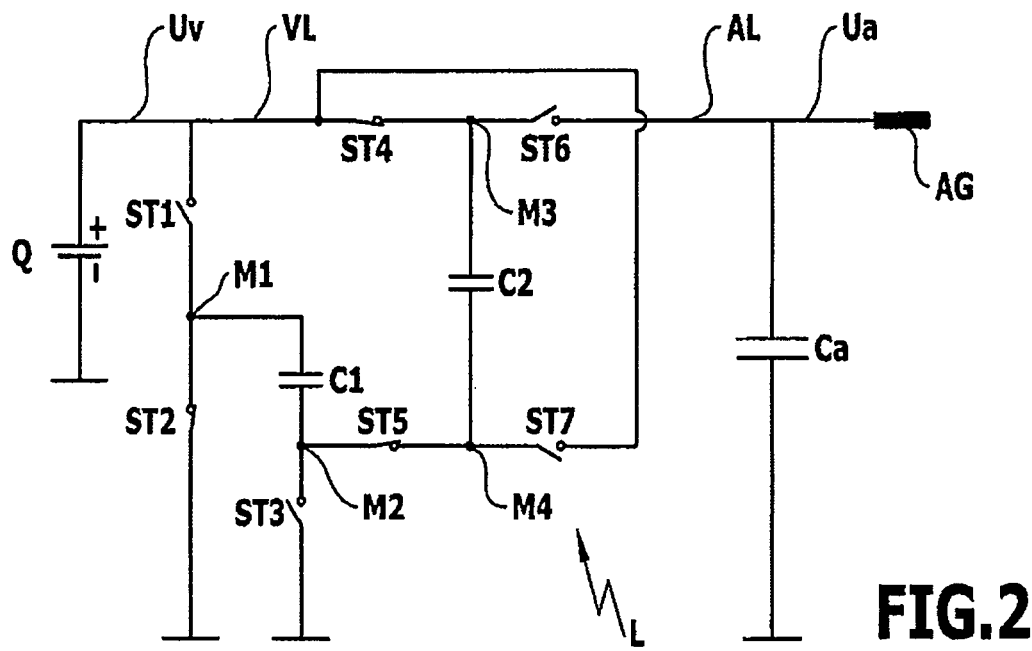
FIG. 2 is a schematic diagram of the exemplary power supply shown in FIG. 1 in a second clock state.

An exemplary embodiment of a power supply according to the present disclosure is shown, for example, in FIGS. 1 and 2. Such exemplary power supply, which can be configured as charge pump circuit L, can include a voltage source Q, which can provide a supply voltage Uv to a supply line VL.

The exemplary power supply can also include two electronically-controlled series-connected switches, e.g., ST1 and ST2, which can be provided as a push-pull stage between the supply line VL and ground, with which a first center tap M1 positioned between the first switch ST1 and the second switch ST2 can be switched either to the supply voltage Uv or to ground.

A first charge pump capacitor C1 can be situated between the first center tap M1 and a second center tap M2, wherein a third electronic switch ST3 can further be provided with which the second center tap M2 can be connected to ground.

A second charge pump capacitor C2 can be situated between a third center tap M3 and a fourth center tap M4, wherein the third center tap M3 can be connected to the supply line VL via a fourth electronic switch ST4 and the fourth center tap M4 can be connected to the second center tap M2 via a fifth electronic switch ST5.

The third center tap M3 can furthermore be connected to the output line AL via a sixth electronic switch ST6 and the fourth center tap M4 can be connected to the supply line VL via a seventh electronic switch ST7. The output line AL leading to output AG can be connected to ground via an output-side capacitor Ca at where output voltage Ua can be applied.

FIGS. 1 and 2 depict schematic diagrams of two different clock states A (FIG. 1) and B (FIG. 2) with the different switches ST1 to ST7 generating the output voltage Ua, in accordance with exemplary embodiments of the present disclosure.

For example, in a first clock state A, as shown in FIG. 1, the first switch ST1 can be closed and the second switch ST2 can be open so that the supply voltage Uv can be applied to the first center tap M1, wherein the third switch ST3 can be furthermore closed and thus the second center tap M2 grounded such that the first charge pump capacitor C1 positioned between center taps M1 and M2 can be charged to supply voltage Uv.

The fourth and fifth switch ST4 and ST5 can thereby be open so that there is no connection to the second charge pump capacitor C2, yet the sixth switch ST6 and the seventh switch ST7 can be closed so that the output voltage Ua, yielded by the supply voltage Uv plus the voltage of the charge pump capacitor C2, which corresponds in this case—as will be described in detail below—to approximately double the supply voltage Uv can be applied to output line AL such that the output voltage Ua at output AG can correspond to approximately three times the supply voltage. This voltage can be stabilized by output capacitor Ca.

In a second clock state B, shown in FIG. 2, the first switch ST1 can be open so that the first charge pump capacitor C1 is not connected to the supply line VL. Conversely, the second switch ST2 can be closed so that the first center tap M1 can be connected to ground.

The third switch ST3 can furthermore be open and the fifth switch ST5 closed; additionally, the fourth switch ST4 can also be closed.

Thus, the first charge pump capacitor C1 and the second charge pump capacitor C2 can be connected in series, wherein the connection of the first charge pump capacitor C1 connected to the first center tap M1 and positively charged in a first clock state A can be grounded while the second connection of the first charge pump capacitor C1 connected to the second center tap M2, negatively charged in the first clock state A, now can exhibit a negative potential of −Uv compared to ground.

The second charge pump capacitor C2 now lies between this negative potential −Uv at center tap M2 and potential Uv in the second clock state B such that the second charge pump capacitor C2 can be charged to a voltage which corresponds to approximately double the supply voltage Uv.

Since switches ST6 and ST7 can be open, there is no connection between the third center tap M3 and the output line AL and the voltage source Q thus can quickly charge the fourth center tap M4 from supply line VL and the second charge pump capacitor C2 lying at between a potential totaling about double the supply voltage Uv via the first charge pump capacitor C1.

The next clock state then again corresponds to the first clock state A shown in FIG. 1 in which the second charge pump capacitor C2 can be connected in series between the output line AL and ground to voltage source Q so that the output voltage Ua amounts to approximately three times the supply voltage Uv.

Figure 3:
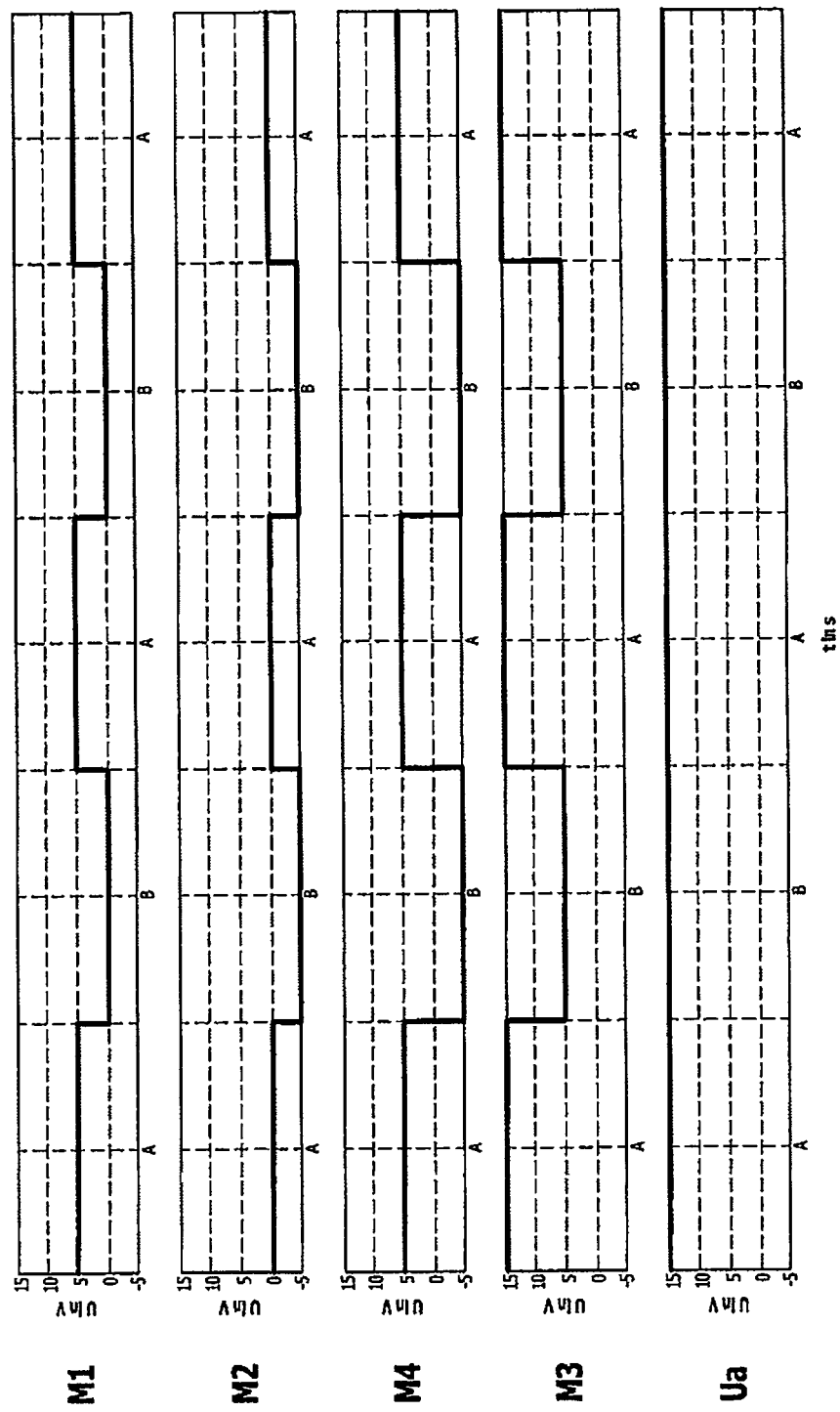
FIG. 3 is an exemplary graphic diagram representation of potentials at individual center taps of the exemplary power supply shown in FIG. 1.

If the positions of switches ST1 to ST7 pursuant the first clock state A shown in FIG. 1 and the positions of switches ST1 to ST7 pursuant the second clock state B illustrated in FIG. 2 are now alternated according to the respectively same clock period, then the voltages shown in FIG. 3 in the first clock state A and the second clock state B can be applied to the center taps M1 to M4 so as to result in each case without load in output voltage Ua, preferably kept stable by output capacitor Ca.

The exemplary power supply according to exemplary embodiments of the present disclosure shown in FIGS. 1 to 3, and described in conjunction with the present figures can be improved by interconnecting two such charge pump circuits L, as shown in FIGS. 1 to 3 in two channels, namely one in a channel K1 and the other in a channel K2, wherein channel K1 and channel K2 are preferably inversely clocked.

The electronic switches ST11 to ST71 of channel K1, for example, can correspond to the electronic switches ST1 to ST7 of the exemplary power supply shown in FIG. 1, and can be clocked in the two clock states A and B in the same way as described in conjunction with the embodiment shown in FIGS. 1 to 3.

The electronic switches ST12 to ST72 of channel K2 can correspond to the electronic switches ST1 to ST7, for example, of the exemplary power supply shown in FIG. 1, and these can be likewise, as described in conjunction with the exemplary embodiment shown in FIGS. 1-3, clocked in the two clock states A and B, albeit inversely to channel 1, so that when the switches ST11 to ST71 of channel K1 can be in clock state A, the switches ST12 to ST72 of channel K2 can be in clock state B and vice versa.

Figure 5:
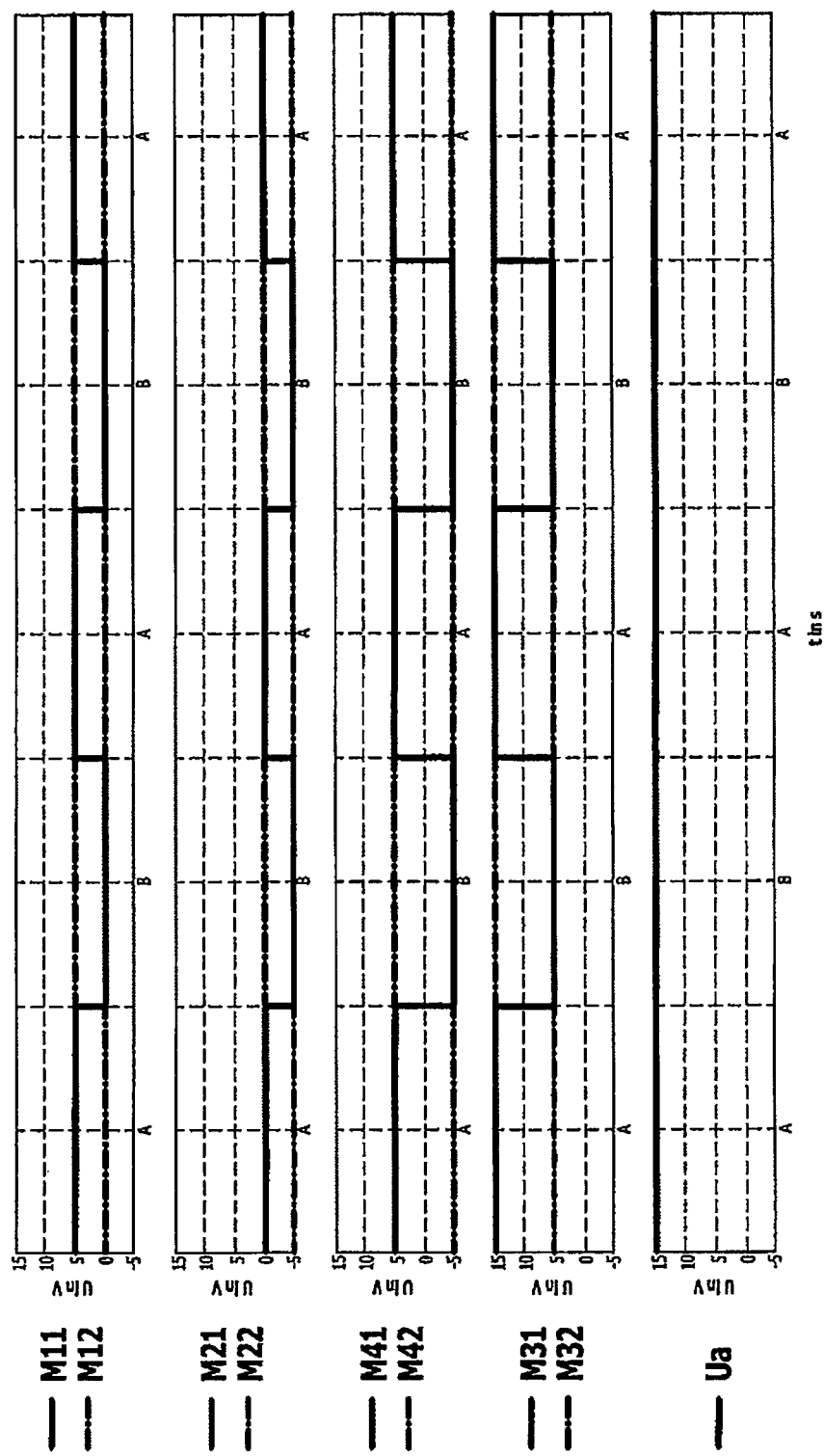
FIG. 5 is an exemplary graphic representation of potentials at individual center taps of the exemplary power supply shown in FIG. 4.

Thus, the voltages shown in FIG. 5 can occur at the center taps M11 to M41 of channel K1 and M12 to M42 of channel K2, wherein FIG. 5 reveals that because channel K1 and channel K2 can work concurrently yet inversely clocked, one of the channels can be in each case in clock state A, in which there can be a supplying of output line AL such that the charge pump capacitor C2 and the voltage source Q lie in series between the output line AL and ground and thus the output voltage Ua, which amounts to approximately three times the supply voltage Uv, can be generated.

Figure 4:
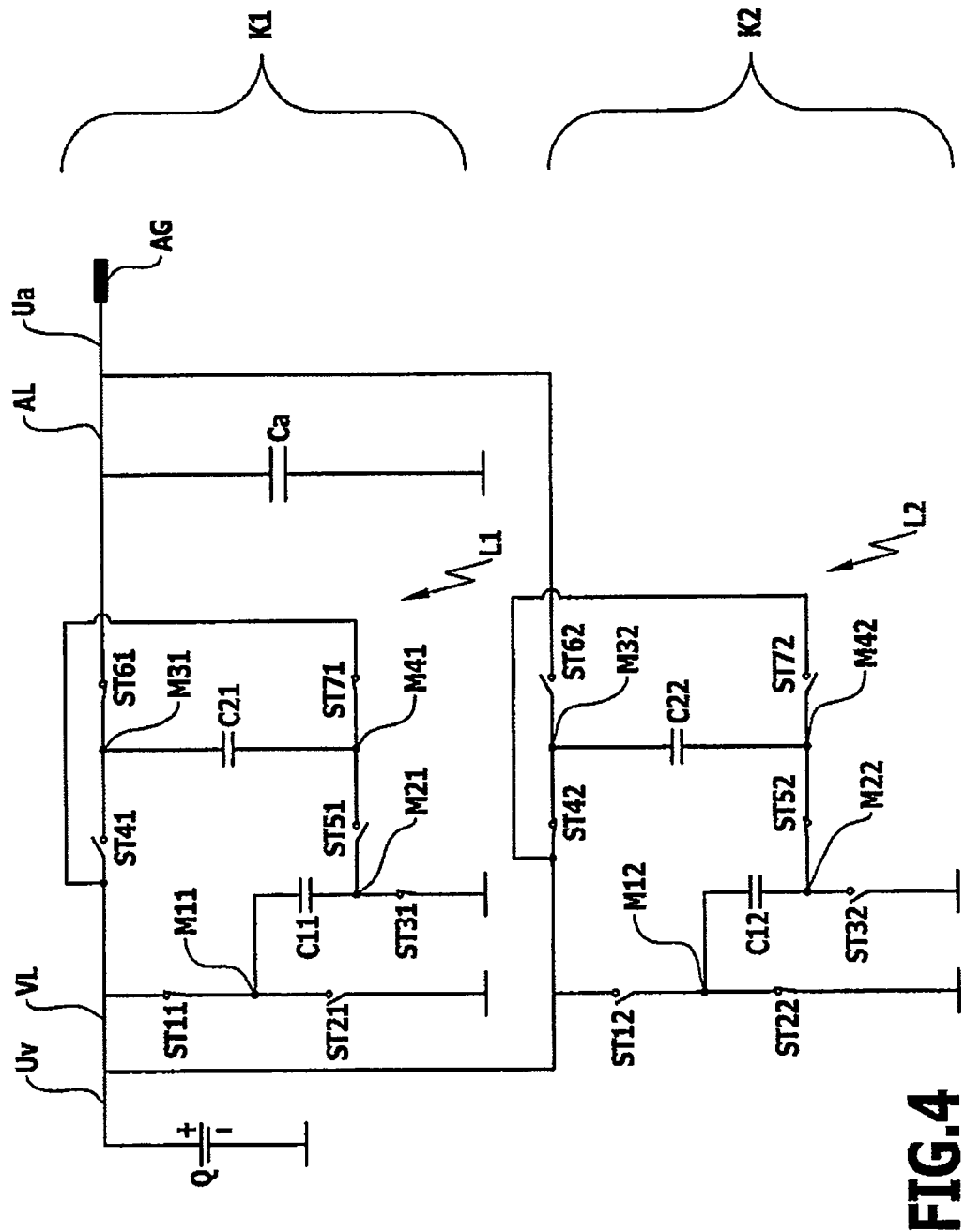
FIG. 4 is a circuit schematic diagram of another exemplary power supply having two channels where one channel is in one clock state and the other channel is in another clock state according to an exemplary embodiment of the present disclosure.
Figure 6:
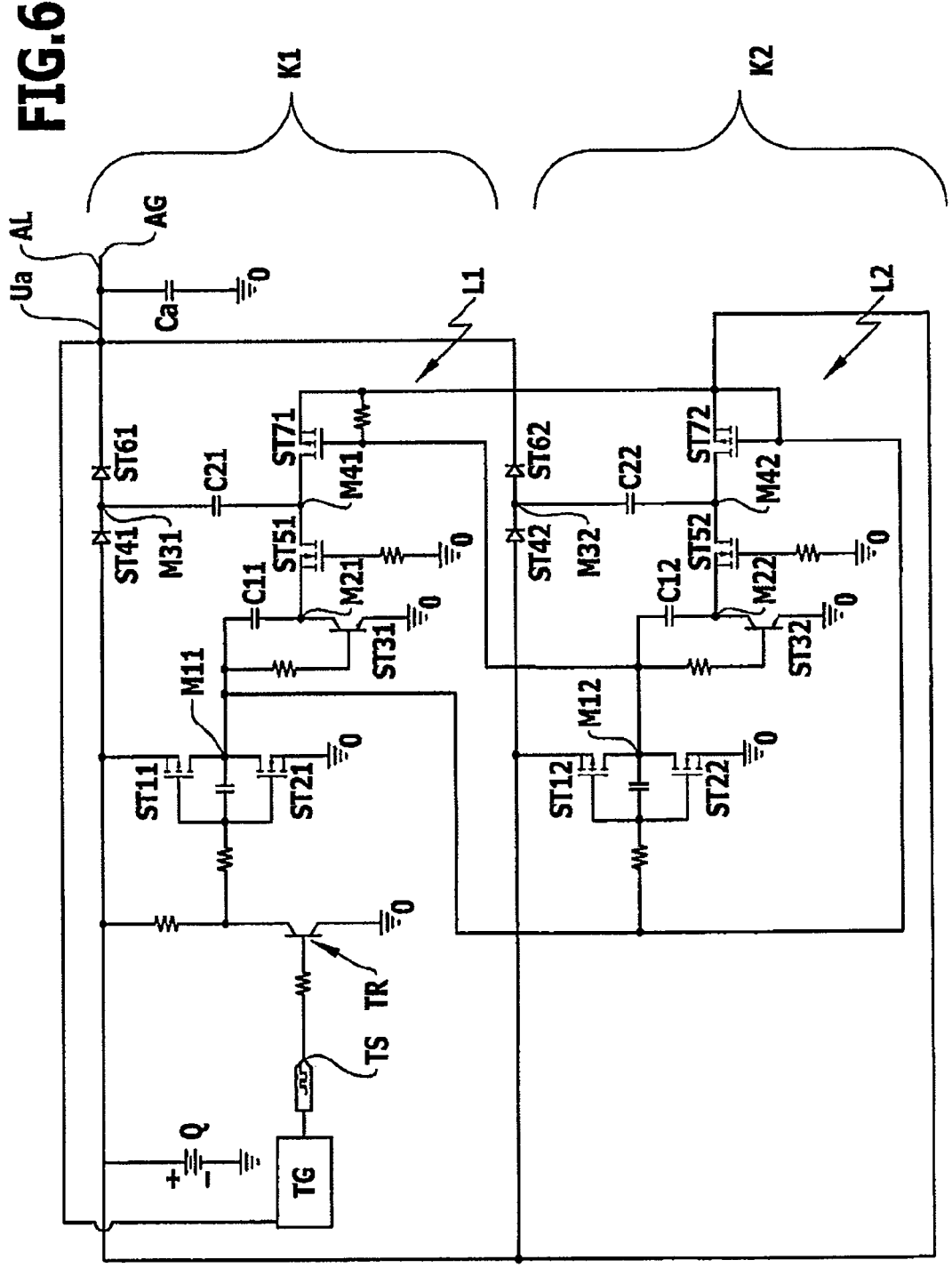
FIG. 6 is a circuit schematic diagram of the exemplary power supply shown in FIG. 4 implemented in a circuit.

In yet another exemplary embodiment of a power supply according to the present disclosure, shown in FIG. 6, the exemplary embodiment of the configuration shown schematically in FIG. 4 can be configured as an actual circuit, wherein a driver stage TR which is fed clock signal TS can also be provided in addition to switches ST11 to ST71 of channel K1.

Moreover shown is the control of the switching transistors ST11 to ST71 of channel K1 and ST12 to ST72 of channel K2, wherein the control can be respectively derived such that the switch positions of the first clock state A in channel K1 and the second clock state B in channel K2 or the second clock state B in channel K1 and the first clock state A in channel K2 alternate.

The clock signal TS can be furthermore generated by a clock generator TG which can synchronously lengthen or shorten the clock cycles of clock state A and clock state B so as to thereby be able to set the voltage Ua resulting from a load between the output line AL and ground to an optimized level between the supply voltage Uv and the tripled voltage Uv. Varying the clock cycle of the first and second clock states A and B thereby can entail different charging times for the first charge pump capacitors C11 and C12 and the second charge pump capacitors C21 and C22 and thus can result in lower voltages adjusted to the respective center taps M.

If the clock periods of clock states A and B of the clock generator TG are controlled as a function of the output voltage Ua, there can be then the possibility of maintaining the output voltage Ua at a constant value of between voltage 0 and a maximum voltage Ua amounting to approximately three times voltage Uv.

The switching transistors ST41 and ST61 as well as ST42 and ST62 in the exemplary embodiment can be moreover replaced by diodes having the same function as was described in conjunction with switching transistors ST41, ST42, ST61 and ST62.

In terms of the functioning of the charge pump circuits L1 and L2 of the exemplary embodiment shown in FIG. 6, reference can be made to the entirety of description provided in connection with the exemplary embodiments shown in FIGS. 1-5.

The foregoing merely illustrates the exemplary principles of the present disclosure. Various modifications and alterations to the described embodiments will be apparent to those skilled in the art in view of the teachings herein. It will thus be appreciated that those skilled in the art will be able to devise numerous modification to the exemplary embodiments of the present disclosure which, although not explicitly shown or described herein, embody the principles of the disclosure and are thus within the spirit and scope of the disclosure. All publications, applications and patents cited above are incorporated herein by reference in their entireties.

The invention claimed is:

1. A power supply, comprising:
a voltage source which is configured to provide a supply voltage; and
at least one charge pump circuit (i) supplied by the voltage source, (ii) including a first charge pump capacitor and a second charge pump capacitor, and (iii) configured to generate an output voltage at an output thereof of the power supply, the at least one charge pump including alternating first and second clock states, wherein:

in the first clock state, the first charge pump capacitor is disposed between the supply voltage and ground, and is charged to the supply voltage by the voltage source, and the second charge pump capacitor is coupled in series between the voltage source and the output of the charge pump circuit, and in the second clock state, the first charge pump capacitor and the second charge pump capacitor are connected in series such that a charged connection of the first charge pump capacitor in the first clock state is grounded, and the second charge pump capacitor is charged by the voltage source.

2. The power supply of claim 1, wherein the at least one charge pump circuit includes a plurality of charge pump circuits, wherein a first one of the charge pump circuits is associated with a first channel, and a second one of the charge pump circuits is associated with a second channel, and wherein the first and second channels operate in parallel, and alternately supply the output.

3. The power supply of claim 2, wherein the first one of the charge pump circuits is in one of the first and second clock states, and the second one of the charge pump circuits is in another one of the first and second clock states.

4. The power supply of claim 2, wherein the charge pump circuits are clocked synchronously.

5. The power supply of claim 2, wherein the charge pump circuits are clocked by one clock generator.

6. The power supply of claim 1, wherein the at least one charge pump circuit is configured to supply the output from a series connection of the second charge pump capacitor and the voltage source.

7. The power supply of claim 1, wherein the at least one charge pump circuit is configured supply the output in at least one of the first and second clock states.

8. The power supply of claim 1, wherein a clock period of the first clock state is approximately equal to a clock period of the second clock state.

9. The power supply of claim 1, wherein the at least one charge pump circuit is configured to charge the first charge pump capacitor using the voltage source and the second charge pump capacitor using the series connection with (i) the first charge pump capacitor and (ii) the voltage source.

10. The power supply of claim 1, wherein the at least one charge pump circuit alternately connects a push-pull stage of a first connection of the first charge pump capacitor to a supply line and to a ground using at least two switches.

11. The power supply of claim 10, wherein the at least one charge pump circuit alternately connects a second connection of the first charge pump capacitor to ground and to the second charge pump capacitor in series using two switches.

* * * * *